US012755030B1

(12) United States Patent
Michalevsky et al.

(10) Patent No.: US 12,755,030 B1
(45) Date of Patent: Oct. 6, 2026

(54) APPARATUS AND METHOD FOR ENCRYPTING FILES FOR APPLICATION-LEVEL DATA PROTECTION IN SECURE ENCLAVES

(71) Applicant: Anjuna Security, Inc., Palo Alto, CA (US)

(72) Inventors: Yan Michalevsky, Palo Alto, CA (US); Thomas Aprelev, Palo Alto, CA (US)

(73) Assignee: ANJUNA SECURITY, INC., Palo Alto, CA (US)

( * ) Notice: Subject to any disclaimer, the term of this patent is extended or adjusted under 35 U.S.C. 154(b) by 143 days.

(21) Appl. No.: 18/324,838

(22) Filed: May 26, 2023

Related U.S. Application Data

(60) Provisional application No. 63/348,978, filed on Jun. 3, 2022.

(51) Int. Cl.

| | |
|---|---|
| ***G06F 21/00*** | (2013.01) |
| ***G06F 21/60*** | (2013.01) |
| ***G06F 21/74*** | (2013.01) |
| ***G06F 21/78*** | (2013.01) |
| *H04L 9/32* | (2006.01) |

(52) U.S. Cl.
CPC ............ *G06F 21/602* (2013.01); *G06F 21/74* (2013.01); *G06F 21/78* (2013.01); *H04L 9/3242* (2013.01)

(58) Field of Classification Search
CPC ...... G06F 21/602; G06F 21/604; G06F 21/74; G06F 21/78; H04L 9/3242
See application file for complete search history.

(56) References Cited

U.S. PATENT DOCUMENTS

| | | | | |
|---|---|---|---|---|
| 9,537,657 | B1 * | 1/2017 | Char | H04L 9/0637 |
| 9,679,160 | B1 * | 6/2017 | Zhang | H04L 9/0894 |
| 10,268,832 | B1 * | 4/2019 | Ciubotariu | H04L 63/123 |
| 2014/0281587 | A1 * | 9/2014 | Ignatchenko | G06F 21/64 713/193 |
| 2014/0317407 | A1 * | 10/2014 | Minematsu | G06F 21/64 713/170 |
| 2017/0070531 | A1 * | 3/2017 | Huston, III | H04L 63/0428 |
| 2018/0219841 | A1 * | 8/2018 | Nadler | H04L 9/3236 |
| 2022/0103338 | A1 * | 3/2022 | Brooker | G06F 21/6218 |
| 2022/0182217 | A1 * | 6/2022 | Jaquette | H04L 63/0428 |

* cited by examiner

*Primary Examiner* — Ellen Tran

(74) *Attorney, Agent, or Firm* — David R. Stevens; Stevens Law Group

(57) ABSTRACT

A non-transitory computer readable storage medium has instructions executed by a processor to divide a digital file into partitions. Advanced Encryption Standard-Galois/Counter Mode (AES-CSM) encryption is used to form encrypted partitions of the partitions, where each encrypted partition has a unique Message Authentication Code (MAC). An update to a specified encrypted partition is received. AES-CSM encryption is used on the specified encrypted partition to compute a new unique MAC to form a new specified encrypted partition without processing any other encrypted partition.

13 Claims, 4 Drawing Sheets

APPARATUS AND METHOD FOR ENCRYPTING FILES FOR APPLICATION-LEVEL DATA PROTECTION IN SECURE ENCLAVES

CROSS-REFERENCE TO RELATED APPLICATION

This application claims priority to U.S. Provisional Patent Application 63/348,978, filed Jun. 3, 2022, the contents of which are incorporated herein by reference.

FIELD OF THE INVENTION

This invention relates generally to data security. More particularly, this invention is directed toward techniques for encrypting files for application-level data protection in secure enclaves.

BACKGROUND OF THE INVENTION

Encryption of data at-rest is a longstanding Information Technology (IT) industry problem that was addressed in multiple ways under different threat models and constraints. For example, full-disk encryption (FDE) addresses the threat of physical access to the disk, or the ability of a malicious actor to mount and read the entire volume. This protects from an actor that physically extracts the storage, or tries to read it directly, circumventing the operating system. However, it doesn't protect against an attacker that obtained the credentials to log into the operating system, or remotely execute code on it. In this case, the attacker can read the storage content after it was already decrypted by the hardware or the lower layers of the operating system, rendering full-disk encryption ineffective. To address this threat, sensitive application data is encrypted independently of the full-disk encryption. Most full-disk encryption schemes do not protect against tampering or data corruption, usually providing only confidentiality, but not integrity. Concerns around storage overhead resulted in designs using Advanced Encryption Standard (AES) modes like XEX Tweakable Block Ciphertext Stealing (XTS) that maintain the input data size, but do not generate the authentication tags necessary for integrity protection of the data. Authentication tags, also referred to as Message Authentication Codes (MACs), are used to authenticate the origin and nature of messages. MACs use authentication cryptography to verify the legitimacy of data sent through a network or transferred from one person to another. An attacker's ability to modify the data can result in compromising confidentiality, by observing how the system reacts to changes in the ciphertext and based on that, inferring the plaintext.

Application-level authenticated encryption turns out to be of particular interest in the context of secure enclaves and Trusted Execution Environments (TEE). Secure Enclave technologies, such as Intel SGX®, AMD SEV® or AWS Nitro® Enclaves, introduce a strong threat model where an attacker can access anything on the host outside the enclave itself. Under this threat model, enclave code can still encrypt data before storing it at rest, preventing the attacker from reading the plaintext or tampering with the data.

Some popular applications encrypt data at-rest. One example is the SQLite Encryption Extension (SEE). It uses Advanced Encryption Standard (AES) in either Output Feedback (OFB) or counter with cipher block chaining message (CCM) mode to encrypt the data. SQLCipher uses AES-CBC (Cipher-Block Chaining) encryption with an HMAC to protect the database. Each database page is encrypted separately with its own IV. The default page size is 4096 bytes. While there is a MAC attached to each page preventing tampering, it does not prevent an attacker from rolling back certain pages to previous versions with a correct, but not up-to-date MAC. That can result in data corruption by generating a state that has never actually existed after any successfully completed transaction.

Some vendors use AES-GCM (Galois/Counter Mode), which uses both AES and Galois/Counter Mode techniques to provide authenticated encryption. Without access to the source code, it is not clear which integrity guarantees are provided when using this mode, and whether mix-and-match attacks are possible. Nor it is clear whether random access within encrypted files is supported or whether it is required at all.

It is known to encrypt data at-rest transparently to applications by using a kernel-level module that encrypts I/O. It is also known to use AES encryption in CBC mode. CBC is short for cipher-block chaining.

A padding oracle attack uses the padding validation of a cryptographic message to decrypt the ciphertext. In some encryption modes, variable length messages are padded to match the block size that the encryption scheme operates on. The attack uses the errors returned by the decryption procedure to differentiate an invalid padding from other error conditions. This enables the attacker to guess the plaintext bytes by tampering with the ciphertext and observing whether the padding is valid. It is mostly associated with the CBC encryption mode used in some block ciphers. Some popular libraries, such as encfs, use CBC mode which makes applications that use them vulnerable to such attacks. There are known arbitrary code execution attacks through manipulation of binary executable files encrypted using CBC mode. In the disclosed threat model, it is assumed that the attacker can tamper with the file content, which makes this finding relevant to the setting of secure enclaves, and strengthens the need for using non-malleable encryption. One of the use-cases considered for trusted execution is the protection of software build pipelines, with the aim of producing trusted output by an attested compiler. In the case of additional confidentiality requirements for the produced binaries, using authenticated encryption is necessary.

Thus, there is a need for a technical solution to address the foregoing prior art challenges.

SUMMARY OF THE INVENTION

A non-transitory computer readable storage medium has instructions executed by a processor to divide a digital file into partitions. Advanced Encryption Standard-Galois/Counter Mode (AES-CSM) encryption is used to form encrypted partitions of the partitions, where each encrypted partition has a unique Message Authentication Code (MAC). An update to a specified encrypted partition is received. AES-CSM encryption is used on the specified encrypted partition to compute a new unique MAC to form a new specified encrypted partition without processing any other encrypted partition.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
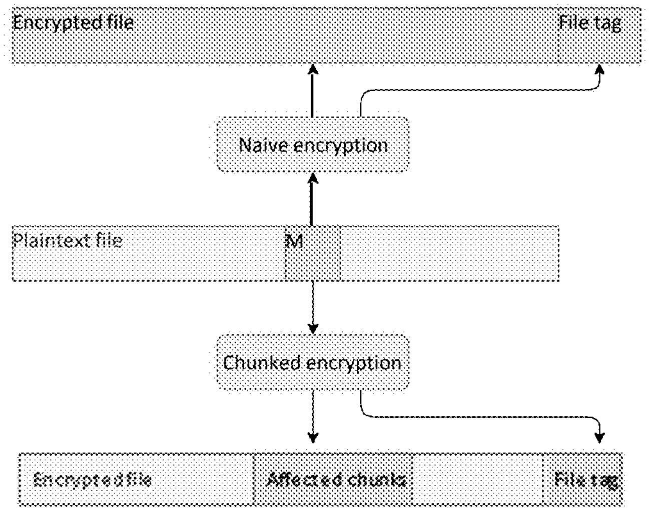
FIG. 1 illustrates differences between entire file encryption and chunked file encryption utilized in accordance with an embodiment of the invention.

Disclosed is an encrypted file format and an authenticated encryption scheme that enable common file I/O operations to be carried out efficiently and with well-defined complexity. Contrary to existing encryption solutions in applications such as SQLite, the disclosed scheme provides fully authenticated encryption that prevents mixing data chunks from different versions of the file. The disclosed technique also provides a variant which trades-off some integrity aspects for increased performance.

The disclosed technology is used in the context where an adversary attempts to compromise the confidentiality and integrity of encrypted and authenticated data. The adversary may arbitrarily tamper with the file contents by modifying data, rearranging parts of the file, and mixing content from different versions of the same file.

We explicitly do not consider rollback attacks, if the rollback is to a coherent file version that existed at some point. We protect against partial rollback attacks, where the adversary mixes parts of the file that existed each one on its own, but not as a combination ever actually written to the storage by the application.

For a cipher to provide Authenticated Encryption it needs to be Chosen-Plaintext Attack (CPA)-secure as well as provide Ciphertext Integrity, such that an adversary cannot create new ciphertexts that decrypt properly.

The invention is disclosed in the context of the following terms.

| | |
|---|---|
| V* | is the set of all bit strings of a finite length including the empty string, substrings and string components that are enumerated from right to left starting from zero; |
| $V_s$ | is the set of all bit strings of length s, where s is a non-negative integer; for s = 0 the $V_0$ consists of a single empty string; |
| k | is the key size of the block cipher (in bits); |
| b | is the block size of the block cipher (in bits); |
| s | is the size of the chunk (in bits); |

The disclosed technology is the design of an encrypted file format and an authenticated encryption scheme that enables fast random read and write access to a given offset within a file. In terms of security, we require a file-encryption scheme to provide confidentiality and integrity. This means that the contents of a file created by, or for, an application cannot be revealed, or tampered with by an unauthorized user or application.

In terms of performance, we require the scheme to enable efficient random access, efficient basic file-operations, and scalability. Efficient random access means that the encryption scheme enables an application to access the content of the encrypted file at arbitrary offsets with complexity independent of the file size. This includes reading, extending, and modifying the contents of the file. Basic file operations include opening a file, appending, or modifying its content at a given offset, reading the contents of the file at arbitrary offsets and closing the file. Subsequently, we list the specific POSIX system calls supported and their complexity under the disclosed encryption scheme.

Scalability means that, ideally, we should also be able to scale the performance of the algorithms with resources such as additional CPU cores, as well as take advantage of hardware acceleration.

In addition, we prefer using standard cryptographic constructs, i.e., standard encryption algorithms, ideally approved by NIST or included as part of the FIPS 140-2 specification.

A naïve encryption approach is to use authenticated encryption over the entire content of a file as if it were a single message. Security-wise, this approach addresses the confidentiality and integrity requirements we stated. This is suitable for either sequential reading or writing of a file (for instance, creating a new file in append-only mode).

This approach, however, incurs significant performance overhead when the content of an encrypted file is modified at random offsets, which is often the use-case for file-based operations such as pwrite, or write following seek.

If the entire file content constitutes a single message, changing any single byte requires re-encryption of the entire file. In a model where user changes are reflected immediately, the cost of re-encryption makes the random access I/O extremely inefficient.

FIG. 1 characterizes the difference in the cost of changing the content of an encrypted file between the naive and chunked approaches to file encryption. In the center of the figure is the plaintext file content. M represents the portion of the content changed by the user. The naive approach to file encryption (shown in the top half of the figure) requires re-encryption of the entire file regardless of the size of the change M. When large files undergo frequent but small changes at random offsets, the overhead incurred by the naive approach renders it highly inefficient. Contrastingly, a chunked approach to file encryption (shown in the bottom half of the figure) only requires re-encryption of the chunks directly affected by the change M which reduces the cost of file content changes and hence increases the efficiency of file encryption in such scenarios.

We briefly review the definition of Galois/Counter Mode (GCM) encryption. The two main functions that GCM uses are block cipher encryption of b-bit blocks and multiplication over the field GF $(2^b)$ defined by $x^{128}+x^7+x^2+x+1$ for block size b=128.

The block encryption of the value X∈V b with the key K is denoted as EK(X). The multiplication of two elements $\{X, Y\} \subset GF(2^b)$ is denoted as X·Y, and the addition of X and Y is denoted as X+Y. The expression $0^l$ denotes a string of l zero bits, and A||B denotes the concatenation of two-bit strings A and B. The function $MSB_t(S)$ takes a bit string S and returns the bit string containing only the leftmost t bits of S.

Inputs GCM takes a secret key K, a nonce N, a plaintext P, and additional authenticated data A as inputs, and outputs a ciphertext C and an authentication tag T. These values are bit strings with lengths satisfying:

$0 \le len(P)=len(C) \le (2^{32}-2)b$, $0 \le len(A) \le 2^{b/2}$, $1 \le len(N) \le 2^{b/2}$, $1 \leq len(T) \leq b$ is usually fixed, len(K) is defined by the block cipher.

Although GCM is defined on bit strings, the bit lengths of the plaintext, the additional authenticated data, and the nonce are required to be multiples of 8, so that these values are byte strings. For each fixed value of the key K, each value of the N must be distinct, but those values do not need to have equal lengths.

Partitioning During the encryption and decryption, the bit strings P, C, and A are broken up into b-bit blocks.

We let n and u denote the unique pair of positive integers such that the total number of bits in the plaintext is b(n−1)+u, where $1 \leq u \leq b$. The plaintext has a sequence of n bit strings, in which the bit length of the last bit string is u, and the bit length of the other bit strings is b. The sequence is denoted $P_1, P_2, \ldots, P_{n-1}$, $$P_n^*,$$

where $$P_n^*$$

may not be a complete block.

Similarly, the ciphertext is denoted as $C_1, C_2, \ldots, C_{n-1}$, $$C_n^*,$$

where the number of bits in the final block $$C_n^*$$

is u.

The additional authenticated data A is denoted as $A_1, A_2, \ldots, A_{m-1}$, $$A_m^*,$$

where the last bit string $$A_m^*$$

may be a partial block of length v, and m and v denote the unique pair of positive integers such that the total number of bits in A is b(m−1)+v and $1 \leq v \leq b$.

Figure 2:
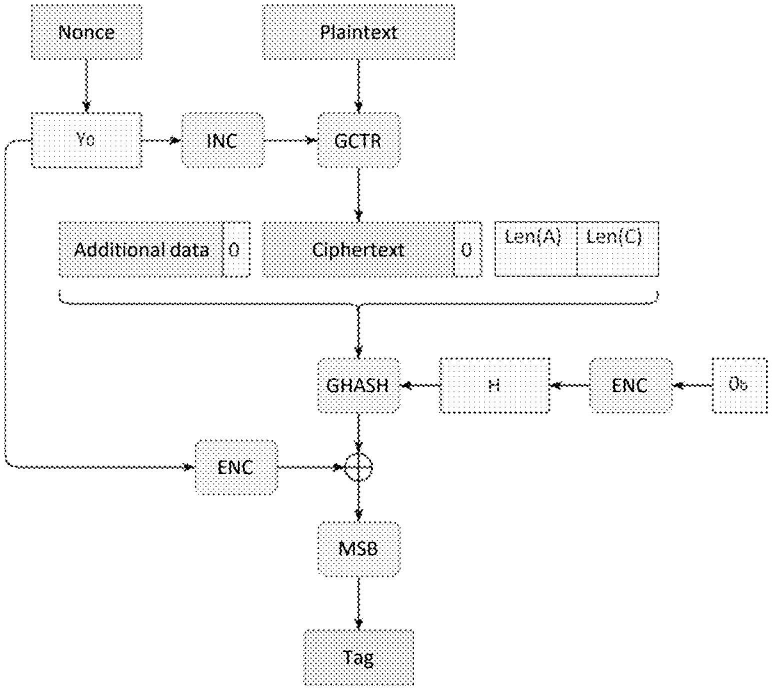
FIG. 2 illustrates basic operations of Galois/Counter Mode encryption utilized in accordance with an embodiment of the invention.

FIG. 2 illustrates the basic operation of Galois/Counter Mode (GCM) encryption. The nonce is used to derive the initial counter value Y0 from which a sequence of block-size counter values is generated with the incrementing operator INC. To generate a new counter value, INC increments the rightmost 32 bits of the block as a non-negative integer modulo 2^32. The counter mode encryption operator GCTR computes the ciphertext C by encrypting the counter values and mixing them with the blocks of the plaintext P. The ciphertext C and the additional data A are zero-padded to multiples of the block size and combined with their encoded bit-lengths len(A) and len(C) in a single message. The hashing operator GHASH evaluates a GF(2^128) polynomial in the hash key H where coefficients are the blocks of the message. The hash key H results from encrypting the block-size zero constant 0^b. The initial counter value Y0 is encrypted ("ENC") and mixed with the value of the polynomial to produce a block-size authentication tag (shown at the bottom of the figure) that is optionally shortened to the desired length by the trimming operator MSB. MSB retains the most significant bits of the block.

Operation First, a sequence of counters $\{Y_i\}$ is generated by incrementing the rightmost 32 bits of the starting value $Y_0$ as a non-negative integer modulo $2^{32}$, where.

$Y_0 \leftarrow N \| 0^{31} \| \mathbf{1}$ for nonces shorter than b−31 bits, and $Y_0 \leftarrow GHASH(H, N)$ otherwise.

The plaintext P is encrypted in a counter-like mode:

$$C_i + --P_i + E_k(Y_i)$$

The additional authenticated data and the ciphertext are separately zero-padded to multiples of b bits, and combined into a single message S:

$$S = A \| 0^{b-v} \| C \| 0^{b-u} \| len(A) \| len(C)$$

The authentication tag is then constructed by feeding blocks $\{S_i\}$ into the GHASH and encrypting the result:

$$T + --MSB_t(GHASH(H, S) + E_K(Y_0))$$

where GHASH function is a polynomial over $GF(2^b)$:

$$GHASH(H, S) = \sum_{j=1}^{m+n+1} S_j \cdot H^{i-j+1}$$

where H, the hash key, is evaluated by encrypting a block of zeroes:

$$H + --E_K(0^b)$$

The authenticated encryption function is illustrated in FIG. 2.

National Institute of Standards and Technology imposes three requirements on all GCM applications.

Nonce uniqueness The probability that the authenticated encryption function ever will be invoked with the same nonce and the same key on two (or more) distinct sets of input data shall be no greater than $2^{-32}$.

Key freshness Any GCM key that is established among its intended users shall, with high probability, be fresh.

Number of invocations The total number of invocations of the authenticated encryption function shall not exceed $2^{32}$, including all nonce lengths and all instances of the authenticated encryption function with the given key.

Since nonces are required to be unique, any plaintext modification yields a fresh nonce, and any nonce change is extremely probable to result in a different sequence of counters $\{Y_i\}$. The ciphertext C depends on the encrypted counter values $\{E_K(Y_i)\}$ and thus cannot be re-computed efficiently once the counter values have changed.

An embodiment of the invention can use Incremental authentication.

Definition 1. The authentication mechanism is said to be incremental if the computation of the tag T* for the (modified) message M* given the tag T for the (unmodified) message M where Δ(M, M*)=k can be done in O(k) steps.

Simply put, incremental MACs allow the re-computation of the authentication tag after the message has been modified in a time proportional to the amount of modification.

Summary We found GMAC to be the only algorithm meeting all our requirements. Refer to table 1 for the rundown on the studied candidates.

TABLE

MAC candidates

| Property | HMAC | CMAC | UMAC | PMAC [3] | GMAC | VMAC |
|---|---|---|---|---|---|---|
| Secure | | ✓ | ? | ? | ✓ | |
| Incremental | | | ? | ✓ | ✓ | |
| Performant | | ✓ | ? | ? | ✓ | |
| Standardized | ✓ | ✓ | | | ✓ | |

GMAC is a specialization of GCM in which the input is restricted to additional authenticated data (len(P)=len(C) =0).

GMAC exhibits the incremental property for extension, in-place modification, and truncation of the message. We provide a conceptual proof for completeness. GMAC follows the hash-then-encrypt approach, and as such can be viewed as a composition of two lower-level functions:

$$GMAC(M, N, K) = GHASH(H, M) + GPRF(N, K)$$

where both the hash key $H=E_K(0)$ and GPRF do not depend on the message M.

GP RF(N, K) does not depend on the Message, and is recomputable in O(1) for any given nonce.

GHASH is a polynomial function of message blocks $\{M_i\}$ over $GF(2^b)$. GMAC inherits the algebraic properties of GHASH, namely linearity, extension and truncation.

$$GHASH(H, M) = n \cdot 2^{\log 2\, b + b/2} \cdot H + \sum_{0 \le i < n} M_i \cdot H^{n-i+1}.$$

Figure 3:
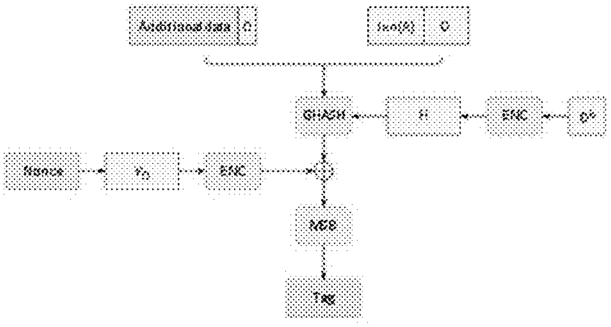
FIG. 3 illustrates basic operations of Galois Message Authentication Code (GMAC) authentication utilized in accordance with an embodiment of the invention.

FIG. 3 illustrates the basic operation of Galois Message Authentication Code (GMAC) authentication. GMAC is a special case of GCM authenticated encryption where the plaintext is empty. The additional data A is zero-padded to a multiple of the block size and combined with its encoded bit-length len(A) in a single message. The hashing operator GHASH evaluates a GF(2^128) polynomial in the hash key H where coefficients are the blocks of the message. The hash key H results from encrypting the block-size zero constant 0^b. The initial counter value Y0 is derived from the nonce, encrypted ("ENC"), and mixed with the value of the polynomial to produce a block-size authentication tag (shown at the bottom of the figure at "Tag") that is optionally shortened to the desired length by the trimming operator MSB. MSB retains the most significant bits of the block.

Lemma 1 (Linearity). For any $H \in \{0, 1\}^b$ and arbitrary bit strings M and M' such that len(M')=len(M t) the following holds $$GHASH(H, M) + GHASH(H, M') = GHASH(H, M + M') + 2^{b/2} \cdot len(M) \cdot H.$$

Corollary 1.1. When an existing message block $M_i$ is changed to $M_i$, the authentication tag T can be updated in O(1) steps:

$$T < c - T \cdot (M_i + M_i) \cdot H^{n-i}.$$

Note that the incrementality of this operation is contingent upon the ability to efficiently compute an arbitrary power $H^{n-i}$ where the change in the first block of the message i=0 is the worst-case scenario.

Lemma 2 (Efficient computation of $H^j$). For any $H \in V^b$ and j satisfying 0 :S j :S k the power $H^j$ can be computed in $O(\log_2 k)$ steps given $O(b \log_2 k)$ additional memory.

Proof. Given a binary representation of the exponent j $$j = \sum_{i=0}^{\lceil \log_2 k \rceil} j_i 2^i,$$

power $H^j$ can be represented as a product $$H^j = \prod_i H^{2^{j_i}}$$

of the binary powers of the hash key H:

$$H = \{H^1, H^2, H^4, \dots, H^{2 \log 2\, k}\},$$

which depend only on the authentication key K and, as such, can be precomputed.

Since the maximum number of blocks authenticated on a single key is limited to max $k=2^{32}$ according to the NIST specification, it follows from lemma 2 that precomputation of at most max $\log_2 k=32$ powers of the hash key enables incrementally updating the authentication tag in case any single block of the original message is modified.

Lemma 3 (Extension and truncation). For any $H \in \{0, 1\}^b$ and any bitstrings $M_1$ such that $len(M_1)$=lb for some value of l and $M_2$ such that $len(M_2) < 2^{b/2}$, the value of GHASH applied to M, a concatenation of $M_1$ and $M_2$, can be computed as $$GHASH(H, M) = GHASH(H, M_2) + H^a \cdot GHASH(H, M_1) + H \cdot len(M_1) \cdot 2^{b/2} + H \cdot len(M) \cdot 2^{b/2}$$

where a=[len(A)/b] denotes the number of b-bit blocks in the block decomposition of $M_2$.

Corollary 3.1. When a new block $M_{n+1}$ is appended to the end of the message, the authentication tag T can be updated in O(1) steps:

$$T + --(M_{n+1} + T \cdot H) \cdot H.$$

Corollary 3.2. When the last block Mn is removed from the message, the authentication tag T can be updated in O(1) steps:

$$T + --\left(M_n + T \cdot H^{-1}\right) \cdot H^{-1}.$$

While the incremental truncation is possible as shown in corollary 3.2, it incurs the pre-computation of the inverse $H^{-1}$. We do not recognize the truncation to be a frequent operation, so we choose to simply recompute the tag in such cases.

The approach more suitable for the encryption of the large files may be derived from the naive approach by applying a divide and conquer technique.

In the chunked approach, the content is partitioned into fixed-sized chunks and each chunk is encrypted individually, which helps achieve two goals:

content modification affecting any given chunk does not require the re-encryption of the entire file, content modification affecting multiple chunks is parallelizable and allows for horizontal scaling.

Encrypting chunks with GCM, by definition, preserves the confidentiality and integrity of each chunk. With confidentiality being a distributive property, it is trivial to show that the chunked approach preserves the confidentiality of all content.

Integrity is not a distributive property so preserving it individually for each chunk does not equate to preserving the integrity of the content. Chunk-level manipulations such as re-ordering or removing chunks from the encrypted file violate content integrity but are not detectable without an additional level of protection.

To preserve the integrity of the content partitioned into chunks, we produce the file tag by applying GMAC to the concatenation of chunk tags. The file tag can be viewed as the root of a depth-2 n-ary Merkle tree where n is the number of chunks.

We choose GMAC over other MACs for its incremental property. When the content is changed, using GMAC allows us to update the file tag in time proportional to the number of chunks affected by the change.

Figure 4:
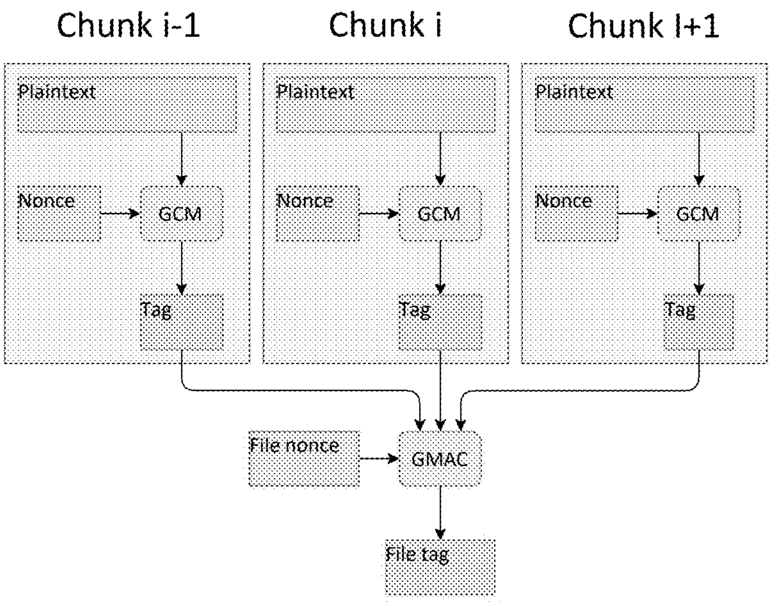
FIG. 4 illustrates a chunked approach to file authentication in accordance with an embodiment of the invention.

FIG. 4 demonstrates a chunked approach to file encryption and authentication. The unencrypted file content is partitioned into fixed-size chunks. In the center of the figure are three adjacent chunks Chunk i−1, Chunk i, and Chunk i+1. The content of each chunk is individually encrypted and authenticated using GCM which results in chunk ciphertexts (not shown) and chunk authentication tags. To detect chunk-level tampering with the ciphertexts such as reordering or removing some or all chunks of the encrypted file, the sequence of chunk authentication tags is authenticated using GMAC which results in a file authentication tag ("File Tag" on the bottom of FIG. 4). On a change to the unencrypted content, the chunks affected by the change are re-encrypted and the file tag is re-computed. Both operations can be performed in time proportional to the size of the change.

Using a random 96-bit nonce limits using the same key to roughly 240 encryption operations due to the Birthday Bound. A counter-based nonce can allow more encryption operations by replacing the probabilistic guarantee for a low-probability of nonce-reuse with a deterministic one. The nonce may consist of a random part, and counterpart that is monotonously increased until the range is exhausted.

The complexity estimates for the basic operations are listed in Table 2.

TABLE 2

Complexity estimates for the basic file operations

| | |
|---|---|
| Creating a new file | O(1) to encrypt empty chunk<br>O(1) to compute initial file tag |
| Opening an existing file (n-byte file) | O(n) to verify each chunk<br>O(n) to verify the file tag |
| Modifying contents (k-byte diff) | O(k) to re-encrypt affected chunks<br>O(k) to update the file tag |
| Appending contents (k-byte diff, n-byte file) | O(k) to re-encrypt the affected chunks<br>O(k) to encrypt new chunks<br>O(k) to update the file tag |
| Prepending contents (k-byte diff, n-byte file) | O(k) to re-encrypt the affected chunks<br>O(k) to encrypt new chunks<br>O(k) to update the file tag |
| Truncating contents (k-byte diff, n-byte file) | O(1) to re-encrypt the trailing chunk<br>O(n) to update the file tag |

The complexity estimates for the system calls (syscalls) are listed below.

| | |
|---|---|
| open, openat (n-byte file) | O(n) |
| read, pread (k-byte diff, n-byte file) | O(k) |
| readv, preadv (k-byte diff, n-byte file) | O(k) |
| write, pwrite (k-byte diff, n-byte file) | O(k) |
| writev, pwritev (k-byte diff, n-byte file) | O(k) |
| ftruncate (n-byte file to m-byte file) | O(n) |
| stat, lstat, fstat, fstatat (n-byte file) | O(1) |
| lseek (n-byte file) | O(1) |
| sync, fsync (k-byte diff, n-byte file) | O(1) if we don't cache the state<br>O(n) if we do |
| close | O(1) |

Figure 5:
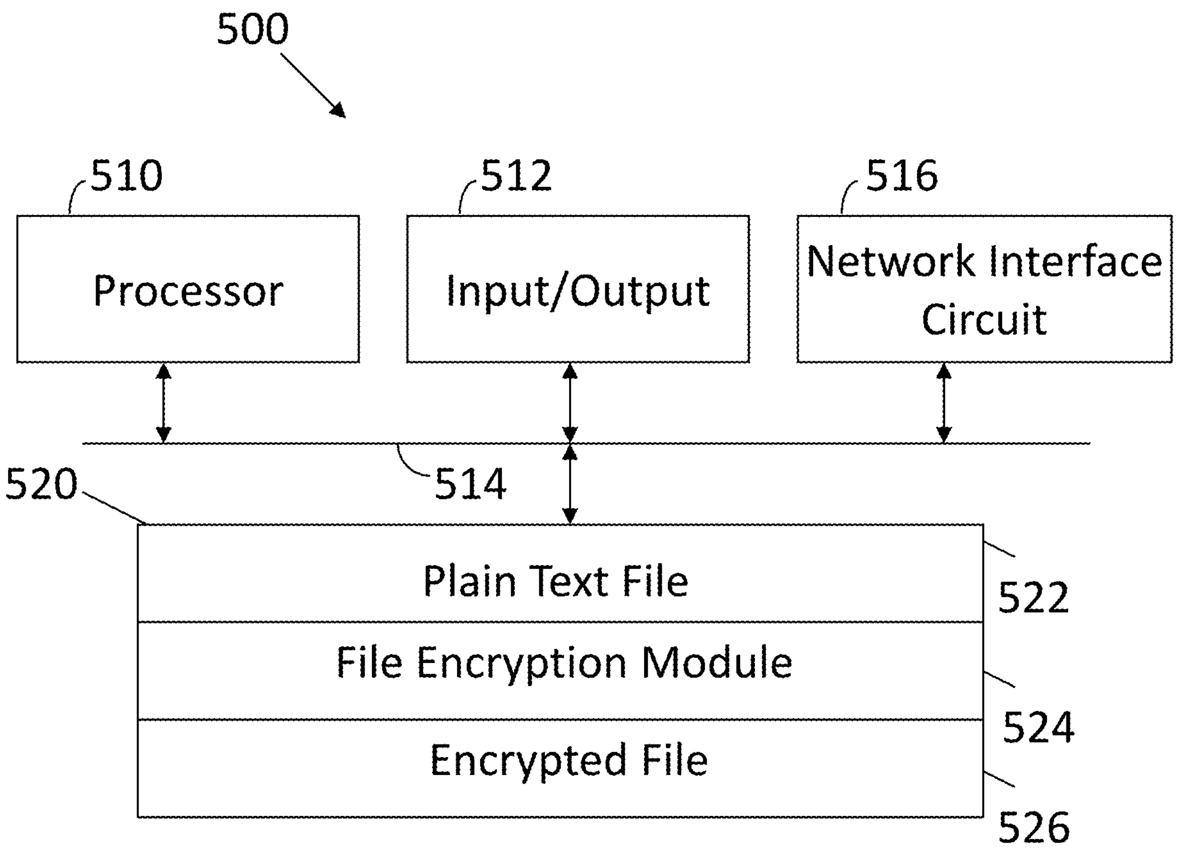
FIG. 5 illustrates a computer configured in accordance with an embodiment of the invention.

FIG. 5 illustrates a computer 500 configured in accordance with an embodiment of the invention. The computer 500 includes a processor 510 (with TEEs) connected to input/output devices 512 via a bus 514. A network interface circuit 516 connected to bus 514 provides connectivity to a network (not shown). A memory 520 is also connected to bus 514. The memory stores instructions executed by processor 510. In particular, the memory 520 stores a plain text file 522 that is processed by a file encryption module 524 as described herein to produce an encrypted file 526.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method comprising:
- receiving a data file for encryption;
- partitioning the data file into a plurality of data chunks, wherein each data chunk comprises authenticated data;
- encrypting each data chunk using a Galois/Counter Mode (GCM);
- generating a chunk authentication tag for each encrypted data chunk;
- generating an encrypted data file comprising a plurality of encrypted data chunks;
- concatenating the chunk authentication tags from the plurality of data chunks; and
- generating a file tag by applying a Galois Message Authentication Code Operation (GMAC) to the concatenated chunk authentication tags to generate a file tag, wherein a modification of the data file results in a re-computation of the file tag, wherein the re-computation is performed using a GCM, and wherein the re-computation can be performed in a time proportional to an amount of the modification.

2. The method of claim 1, wherein the encryption parameter is independent of the authenticated data.

3. The method of claim 1, further comprising zero-padding the authenticated data to be a multiple of a block size associated with the data file.

4. The method of claim 1, further comprising setting a plaintext length to zero, wherein the zero-length plaintext is included as a part of the encryption as an encryption parameter.

5. The method of claim 1, wherein the file tag is a root of a depth-2 n-ary Markle tree, wherein n is a number of encrypted data chunks.

6. The method of claim 1, wherein the file tag can be updated in O(1) steps responsive to a change in data contained in a corresponding data chunk.

7. The method of claim 1, wherein the file tag can be updated in O(1) steps responsive to a new data chunk being appended to an end of the data file.

8. The method of claim 1, wherein the file tag can be updated in O(1) steps responsive to a new data chunk being removed from the data file.

9. The method of claim 1, further comprising detecting chunk-level tampering with the encrypted data file, the detecting comprising:
- authenticating the file tag associated with the data file; and
- determining a change to one or more chunks based on the authenticating.

10. The method of claim 9, further comprising re-encrypting the data file and recomputing each file tag in response to detecting the tampering.

11. The method of claim 1, wherein if a portion of the data file is subsequently modified post-encryption, only a data chunk containing the modified portion of the data file needs to be re-encrypted.

12. The method of claim 1, wherein the GMAC operation is decomposed into a GHASH function and a GPRF function, and wherein a hash key associated with the GHASH function, and the GPRF function are each independent of content in a respective data chunk being encrypted.

13. The method of claim 1, further comprising precomputing, for each data chunk, multiple powers of each hash key associated with the encrypting, and wherein the precomputing enables incrementally updating an authentication tag if an associated data chunk is modified.

* * * * *